United States Patent [19]

Ohnsorge

[11] Patent Number: 5,502,586
[45] Date of Patent: Mar. 26, 1996

[54] OPTICAL NETWORK INCLUDING BRANCH POINTS FEATURING THREE INTERCONNECTED BIDIRECTIONAL OPTICAL WAVEGUIDES HAVING FREE ENDS WITH REFLECTIONLESS TERMINATIONS

[75] Inventor: Horst Ohnsorge, Freiberg, Germany

[73] Assignee: Alcatel SEL Aktiengesellschaft, Stuttgart, Germany

[21] Appl. No.: 253,769

[22] Filed: Jun. 3, 1994

[30] Foreign Application Priority Data

Jun. 5, 1993 [DE] Germany .......................... 43 18 732.3

[51] Int. Cl.$^6$ .............................. H04J 14/00; H04B 10/20
[52] U.S. Cl. .......................... 359/117; 359/118; 359/120; 359/121
[58] Field of Search ................................... 359/125, 126, 359/127, 117, 118, 137, 119, 120, 121

[56] References Cited

U.S. PATENT DOCUMENTS

| | | | |
|---|---|---|---|
| 4,704,713 | 11/1987 | Haller et al. ............................. | 359/125 |
| 4,901,306 | 2/1990 | Gardner ................................... | 359/125 |
| 5,170,451 | 12/1992 | Ohshima .................................. | 359/127 |
| 5,303,077 | 4/1994 | Böttle et al. ............................ | 359/125 |

FOREIGN PATENT DOCUMENTS

| | | |
|---|---|---|
| 0485812 | 11/1990 | European Pat. Off. . |
| 2728686 | 1/1978 | Germany . |

OTHER PUBLICATIONS

Quarmby, "Data highway devices and systems", *Electro Optics/Laser International* Mar. 1976, pp. 61–63.
Harrington, "Fiber and Integrated Optics: A new light on switching", *National Telecommunications Conference*, Dec. 1978, pp. 47.4.1–47.4.5.
D. Rosenberger, Optische Informationsubertragung mit Lichtwellenleitern, published in *Kontakt & Studium*, vol. 96, by Berlin VDE Verlag, 1982, p. 131, line 3–p. 139, line 37, drawings 8.12–8.14.
J. M. Williams et al., The Role of the Wideband Digital Cross–Connect System in Survivable Ring Networks, publ. in Conf. Rec. vol. 1/3, *IEEE Intn'l Conf. on Communications*, May 23, 1993, pp. 237–244.
A. M. Ali et al., Services Integration and Multiplexing for Broad–Band Communication Systems, publ. in *IEEE Journal on Selected Areas in Communications*, vol. SAC–4, No. 4, Jul. 1986, pp. 553, 554, 557.
F. Ellefson, Migration of Fault Tolerant Networks, publ. in Conf. Rec. vol. 1, pp. 65–71 of *GLOBECOM '90 IEEE Global Telecommunications Conference & Exhibition*, Dec. 2–5, 1990.
A. P. McDonna et al., 1.3 um Bidirectional Optical Transmission Over 31 Km of Installed Single–Mode Fibre Using Optical Couplers, publ. in *Electronics Letters*, vol. 20, No. 18, pp. 722–723, Aug. 30, 1984.
M. Irshid et al., Distributed Optical Passive Star Couplers, publ. in *IEEE Photonics Technology Letters*, vol. 3, No. 3, pp. 247–249, Mar. 3, 1991.
A. A. M. Saleh et al., Reflective Single–Mode Fiber–Optic Passive Star Couplers, publ. in *Journal of Lightwave Technology*, vol. 6, No. 3, pp. 392–398, Mar. 1988.
W. Tromballa, Management von Ubertragungsnetzen, publ. in *Telcom Report*, vol. 14, No. 1, pp. 48–51, Jan. 1991.

(List continued on next page.)

*Primary Examiner*—Leo Boudreau
*Assistant Examiner*—Bhavesh Mehta
*Attorney, Agent, or Firm*—Ware, Fressola, Van Der Sluys & Adolphson

[57] ABSTRACT

A fiber-optic network has a branching net in which only three optical waveguides are interconnected at each of a plurality of active or passive branch points (A, B). The branch points are designed to permit bidirectional transmission in each of three paths. Subscriber facilities (F) are connected or connectable to the optical waveguides of the network at arbitrary points. To increase reliability, a fiber-optic ring main (50) is provided to which the ends of the optical waveguides forming a branching net are connectable via controllable optical switches (D).

9 Claims, 3 Drawing Sheets

OTHER PUBLICATIONS

Clarricoats, P. J. B.: Progress in optical commmunication, vol. 2, Peter Peregrinus Ltd on behalf of the Institution of Electrical Engineers, 1982, S.234–236.

Gowar, John: Optical Communication Systems, Prentice--Hall International, Englewood Cliffs, N.J., London, 1984, S.522–533.

Deuxieme Colloque European sur les Transmissions par Fibres Optiques, Groupment des Industries Electroniques (GIEL), Societe des Elec/27./30 Dept. 1976, Paris S.399–407.

"Eradicating the Central Office with Coherent Optical Technology", 1988 International Xurich Seminar on Digital Comm. Mapping Application onto New Technologies (Cat. No. 88Th 0202-2 pp. 59 to 62.

D. Rosenberger, "Optische Informationsubertragung mit Lichtwellenleitern:", Expertverlag, 7031 Grafenau 1/Wurtt, 1982, on p. 38 in Section 8.4.4.

"Y Laser" described in Electronics Letters, 21 Nov. 1991, vol. 27, No. 24, pp. 2268–2269.

Telcom Report 14 (1991), No. 1, pp. 48–51.

PASSIVE BRANCH POINT

ACTIVE BRANCH POINT

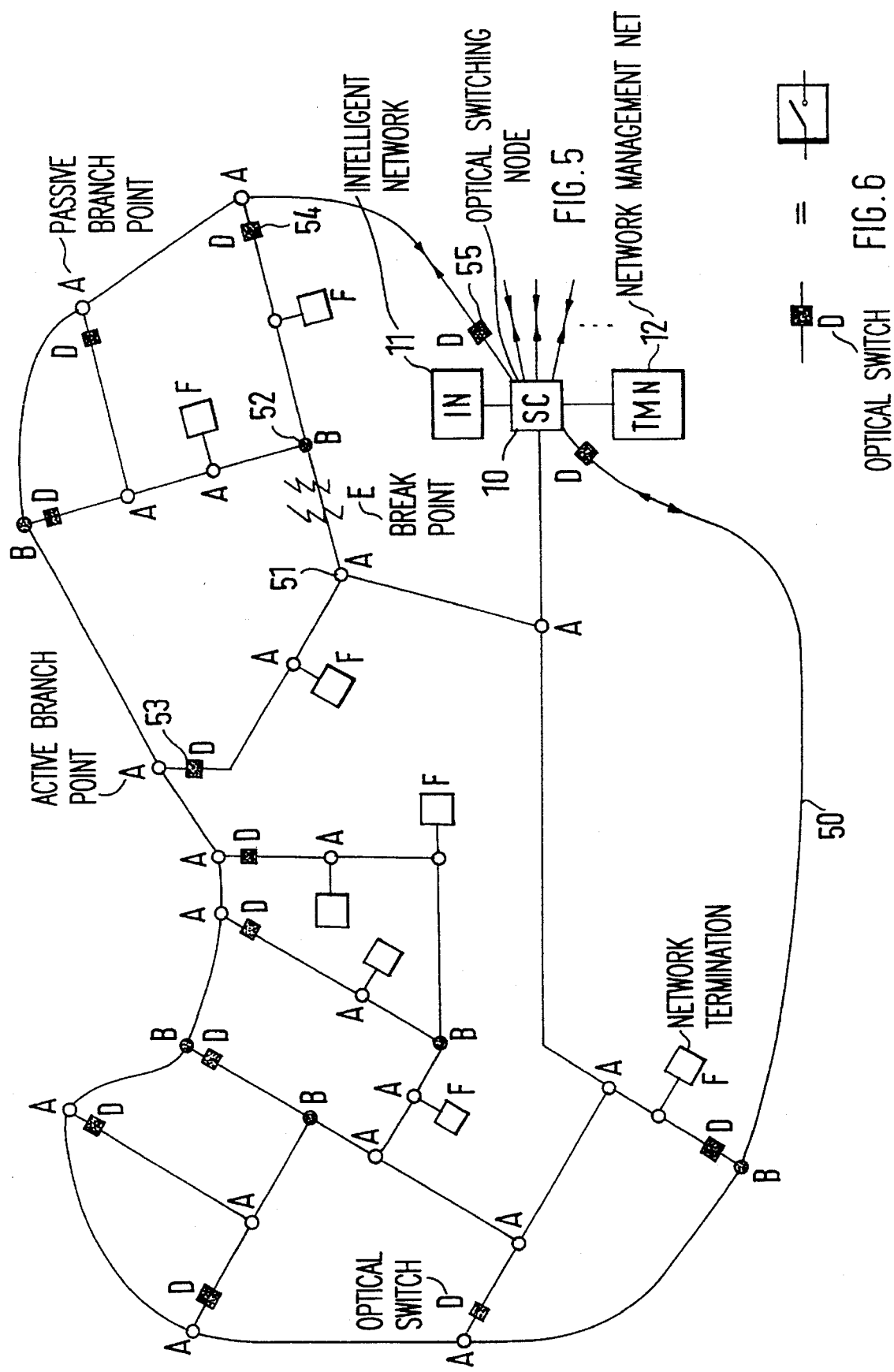

5,502,586

OPTICAL NETWORK INCLUDING BRANCH POINTS FEATURING THREE INTERCONNECTED BIDIRECTIONAL OPTICAL WAVEGUIDES HAVING FREE ENDS WITH REFLECTIONLESS TERMINATIONS

TECHNICAL FIELD

The present invention relates to a network for transmitting messages between subscribers using light as a carrier, wherein the subscribers are connected to connecting points, and wherein optical signals transmitted into the network by any of the subscribers can be received at every subscriber connecting point.

BACKGROUND OF THE INVENTION

A network with the aforementioned features is known from P. Cochrane and M. Brain, "Eradicating the Central Office with Coherent Optical Technology", 1988 International Zürich Seminar on Digital Communications: Mapping New Application onto New Technologies (Cat. No. 88 TH 0202-2), pp. 59 to 62.

The transmission capacity of the network is accessible to all subscribers connected to the network. The network is also referred to as "optical ether". Communication links can be established by selection of the wavelengths of the optical transmitters and receivers provided at the subscribers. As a result, the network offers great flexibility.

The topology of the network is either star or ring. In the case of the star topology, the subscriber connecting points are at the ends of the optical waveguides. At the nodes of the network there are passive power dividers, commonly referred to in the literature as "star couplers", where a great number of optical waveguides are interconnected. As a result, various reflections of optical signals occur during their propagation through the network, so that great engineering efforts are required at the subscribers to eliminate undesired or interfering information. Another disadvantage is that the reliability and quality of the information transmission in the network depends very strongly on the quality of the few star couplers. A single star coupler which is not functioning or not functioning properly will thus degrade the performance of a great number of communication links. In addition, star couplers generally have the disadvantage of severely attenuating optical signals.

SUMMARY OF THE INVENTION

It is the object of the invention to provide an optical network which has the above-mentioned features of the prior art network but does not have the disadvantages described.

The object is attained by a network for transmitting messages between subscribers using light as a carrier, wherein the subscribers are connected to connecting points, and wherein optical signals transmitted into the network by any of the subscribers can be received at every subscriber connecting point, characterized in that the network has branch points, each branch point having three interconnected optical waveguides, that the three optical waveguides interconnected at a branch point are interconnected by a coupler which is bidirectional in each of three transmission paths, that the subscriber connecting points are arbitrary points along the individual optical waveguides of the network, that a coupler which is bidirectional in three transmission paths is provided at each of the connecting points, and that the free ends of the optical waveguides of the network are terminated by reflectionless terminations.

Another object is such a network characterized in that a fiber-optic ring main is provided, and that controllable optical switches are provided at the ends of the optical waveguides of the network for connecting said ends to the fiber-optic ring main.

A further object is such a network characterized in that a network management net is provided for controlling and monitoring the network.

An additional object is such a network characterized in that an optical switching node is provided which connects the network to similar networks.

Another object is such a network characterized in that branch points are insertable at arbitrary points of the network.

BRIEF DESCRIPTION OF THE DRAWINGS

The invention will become more apparent from the following description of embodiments taken in conjunction with the accompanying drawings, in which:

FIG. 5 shows the novel network of FIG. 1 with a ring main added thereto, and

FIG. 6 is a schematic representation of the function of the symbol denoted by D in FIG. 5.

BEST MODE FOR CARRYING OUT THE INVENTION

Figure 1:
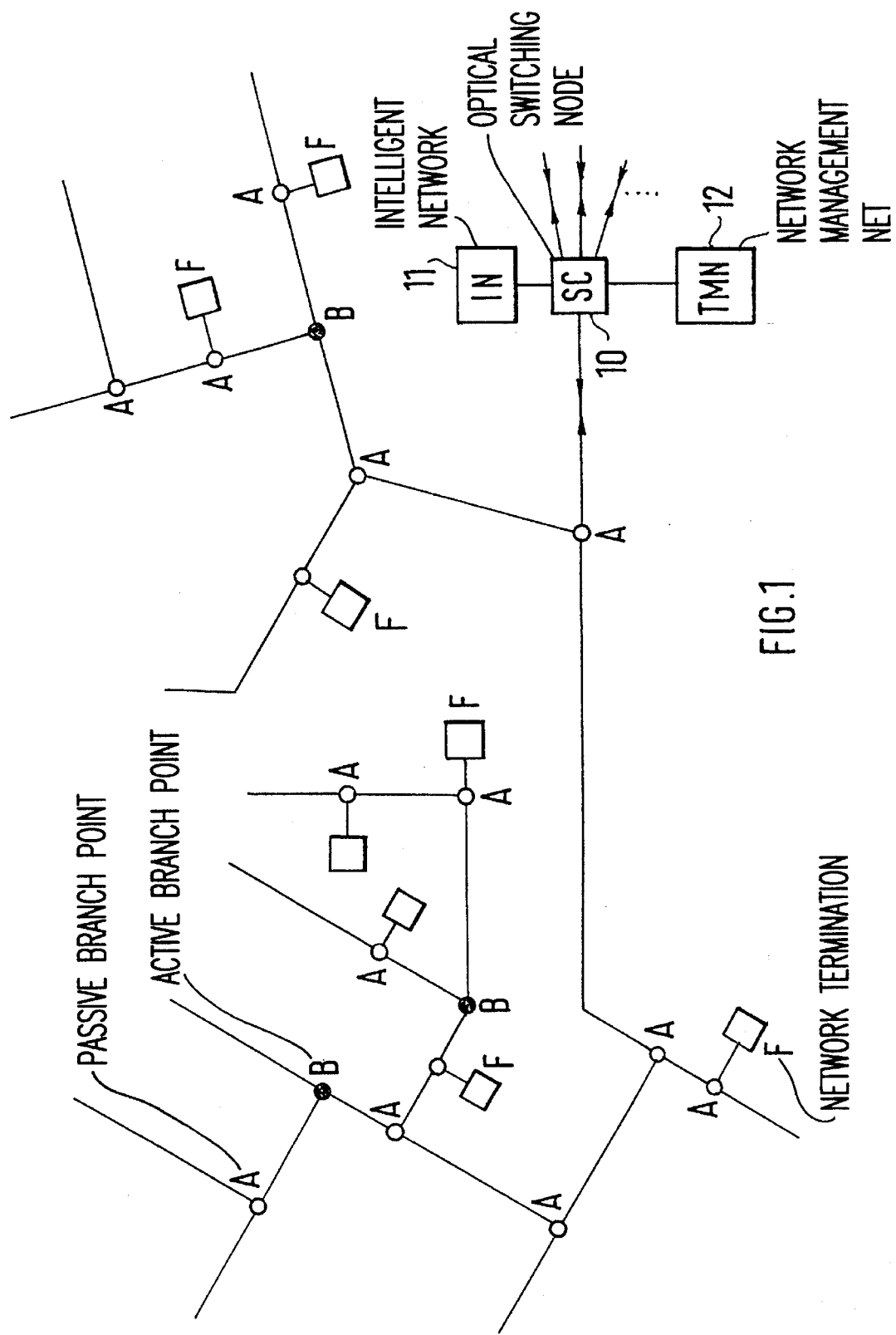
FIG. 1 shows an embodiment of the novel branching net with branch points and subscriber connecting points.

In FIG. 1, the continuous lines represent optical waveguides which are laid in an exemplary geographical area depending on local conditions and requirements for transmission links. Several optical waveguides meet at branch points, so that the optical waveguides and the branch points form a fiber-optic network. One of the essential features of the novel network is that at the branch points, only three optical waveguides are interconnected. (In a fiber-optic network with a star structure, a much greater number of optical waveguides, e.g., 16 or 46, are interconnected at the nodes.) To distinguish the novel network terminologically from the prior art network structures, it will henceforth be called "branching net".

Another essential feature is that no subscriber facilities are connected to ends of optical waveguides. The branching net thus has free ends. This has the advantage that the net is extensible at will, and another essential advantage, which will be described later.

To ensure that no interfering reflections of optical signals occur at free ends of optical waveguides, these ends are terminated by reflectionless terminations. This is a well-known technique, which is mentioned for open optical T buses, for example, in a book by D. Rosenberger, "Optische Informationsübertragung mit Lichtwellenleitern", Expertverlag, 7031 Grafenau 1/Württ., 1982, on page 138 in Section 8.4.4. It therefore need not be explained here.

A further feature of the novel branching net is that the points where subscriber facilities are connected or connectable to the network are arbitrary points along the individual optical waveguides of the network. Wherever it is necessary along a fiber-optic link of the network to connect a subscriber and where the optical waveguide is locally accessible, a connecting point can be inserted into the optical waveguide. How such a connecting point is constituted will be explained below. The same applies analogously if the need arises to add a further branch to the network at any point along an optical waveguide. Then, a branch point will be inserted at such a point.

Figure 2:
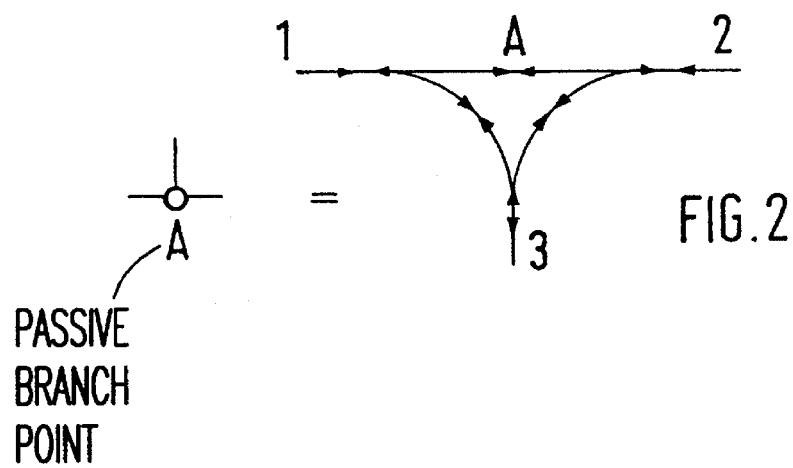
FIG. 2 shows an embodiment of the branch points A of FIG. 1.

The following explains how branch points are constituted in accordance with the invention. FIG. 1 shows that there are differently symbolized branch points A and B in the branching net. The design of a branch point A is shown in FIG. 2. The branch point has three ports 1, 2, and 3 for the three optical waveguides to be interconnected by it. At each port it contains a fiber-optic coupler which is formed by fusing together two lengths of optical waveguide by the well-known technique of making fused fiber couplers. The couplers are so interconnected that an optical-waveguide path exists between every two of three ports. As a whole, they thus form a coupler with three transmission paths, a first path between ports 1 and 2, a second between ports 1 and 3, and a third between ports 3 and 2. Since light transmission in couplers and optical waveguides is always bidirectional, this coupler, too, is bidirectional in each of the three transmission paths. Such a coupler is disclosed in DE-A1-27 28 686, FIG. 4, where it is used in a ring network, however.

Figure 3:
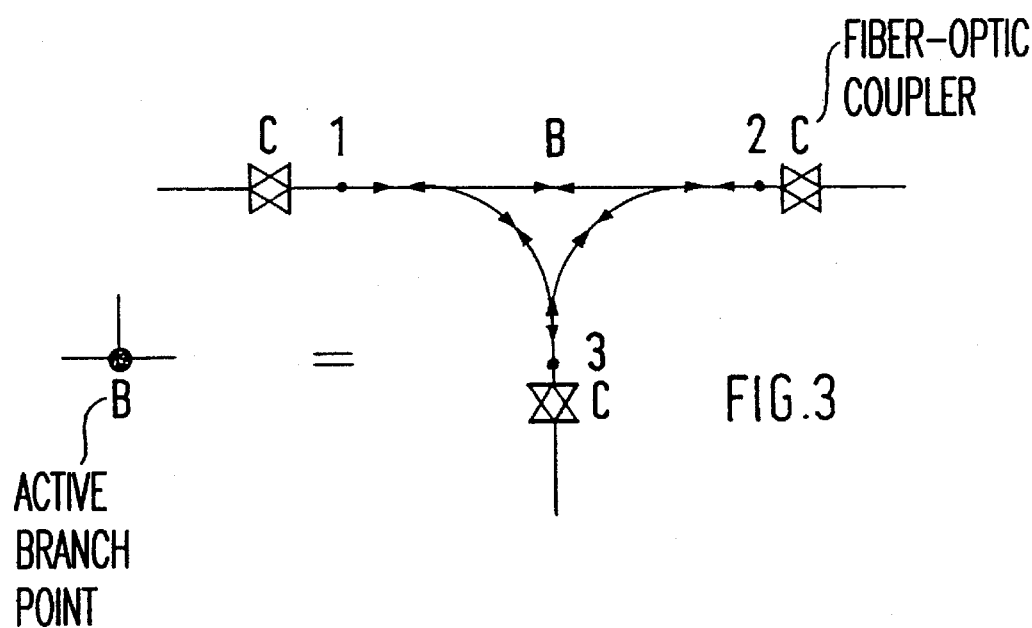
FIG. 3 shows an embodiment of the branch points B of FIG. 1.

As can be seen, a branch point A implemented with a coupler as shown in FIG. 2 is purely passive. However, the novel branching net of FIG. 1 also contains active branch points. They are designated B and are implemented as shown in FIG. 3. They only differ from the branch points A in that at the ports of the coupler, optical amplifiers C, preferably fiber-optic amplifiers with erbium-doped amplifying fibers, are inserted in the transmission paths. Since optical amplifiers are bidirectional, the symbol of a bidirectional amplifier is used for them in FIG. 3. Under certain circumstances it may not be necessary to provide optical amplifiers at all three ports of the coupler forming the branch point.

Figure 4:
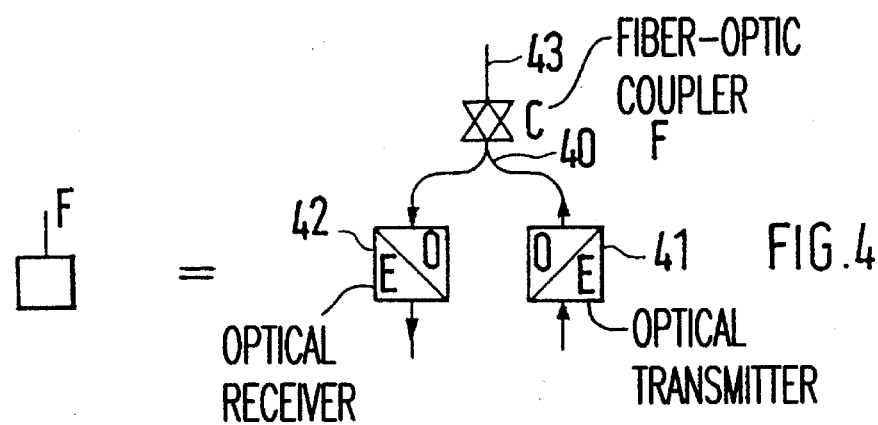
FIG. 4 shows an embodiment of the optical network terminations F of FIG. 1.

Branch points of the above-described kind, as a rule passive branch points A, also serve to connect subscriber facilities to the novel network of FIG. 1. As mentioned above, they can be inserted at arbitrary points along the individual optical waveguides of the network. To each of them a so-called optical network termination F is connected via a length of optical waveguide. FIG. 4 shows how the optical network termination F may be implemented.

By means of a fiber-optic coupler 40, the output of an optical transmitter 41 and the input of an optical receiver 42 are connected to a length of optical waveguide 43 running to the above-mentioned connecting point. The length of optical waveguide 43 contains a fiber-optic amplifier C, which can be omitted if not necessary. Terminals of the subscriber can be connected directly to this optical network termination F, or multiplexers and demultiplexers can be connected for connecting different terminals or different subscribers.

As is readily apparent, the optical network shown in FIG. 1 has the property that optical signals transmitted into the network from a network termination F can be received by any other network termination F. Which optical network terminations are in contact with which others is determined by the wavelength to which the optical transmitters and optical receivers are tuned, as is known from the above-mentioned publication. The optical tranmitters and optical receivers are thus controllable in such a way as to respectively transmit and receive at a particular wavelength.

A wavelength-tunable optical transmitter is, for example, the "Y laser" described in "Electronics Letters", 21st Nov. 1991, Vol. 27, No. 24, pp. 2268–2269. As a wavelength-controllable optical receiver, a heterodyne detector can be used as is disclosed, for example, in EP-A2-0 485 812 (see corresponding U.S. application Ser. No. 07/792,851, filed Nov. 15, 1991, assigned to the present assignee). Access to the network can also be obtained by any of the conventional multiplexing techniques, such as TDMA, CDMA, ATM, STM.

An optical switching node 10 (designated in FIG. 1 by the letters SC for "switching center") serves to link the optical network with one or more other optical networks. Optical switching nodes are known per se (e.g., from DE-OS 41 08 213, see corresponding U.S. Pat. No. 5,303,077, issued Apr. 12, 1994, assigned to the present assignee) and, therefore, need no further explanation.

Networks with which the branching net of FIG. 1 can be linked by the optical switching node 10 may be branching nets of the same kind, or a connection may be implemented to a transport network which provides interfaces to other branching nets and contains no network terminations for subscribers but otherwise may be constructed like the network of FIG. 1. The switching node 10 may also have an "intelligent network" 11 connected thereto through which, like in present-day networks, the subscribers can be offered arbitrary value-added services via the branching net.

A network management net 12 controls and monitors the transmission methods used in the novel branching net, the bit rates, communication, charging, and functional performance. It has access to the branching net via the optical switching node 10. Network management nets for controlling transmission and switching networks are known, for example, from telcom report 14 (1991), No. 1, pp. 48–51.

One possible operating mode of the branching net will now be explained by giving an example. From the foregoing it is obvious, however, that a great number of other operating modes are possible with the novel branching net. Let us assume that each of a number of optical network terminations F has one subscriber connected thereto who has a multimedia terminal for text, graphic, fax, freeze-frame video, and audiovisual communication. If such a group of subscribers wishes a network of its own ("corporate network"), the switching node 10, with the aid of the network management net 12, will allocate to this group a wavelength which is suitable for information transmission at the required maximum bit rate. All optical transmitters 41 and optical receivers 42 of the optical network terminations F are then tuned to the wavelength and set to the predetermined bit rate. The network management net 12 then passes a token from subscriber to subscriber like in an Ethernet. The network termination F addressed by the token may now transmit its message, e.g. in the form of ATM cells, into the network. Because of the branched structure of the network and the couplers A or B, each of which is bidirectional in three transmission paths, each transmitted cell is transported in each branch of the network and travels to the end of each branch, where it is absorbed in a nonreflecting manner. The optical receiver of each optical network termination belonging to the group of subscribers receives the transported optical signal (the network terminations not associated with the group cannot receive it, since they are tuned to another wavelength) and recognizes with the aid of an address (header) belonging to the cell (message) whether the cell is intended for it. If the cell is to be sent to n subscribers, it will be transmitted n times with each destination address or the subscribers belonging to the group ("conferees") will agree upon a common conference address prior to their conference, so that all conferees will receive the cells (conference cells). During a conference, a conferee can also hold a side meeting with one of the other conferees or with a party not participating in the conference by using address of that conferee or party. The conferees can use any medium of the multimedia terminal for communication.

In the above-described operating mode, a virtual network, so to speak, exists within the branching net for the group of subscribers under consideration. The remainder of the branching net can be used parallel thereto in any manner. The interface from one virtual network to other virtual networks of the branching net is provided by the switching node 10 or by switchover of network terminations F under control of the management network 12.

As is apparent from the foregoing description, the novel network offers very great flexibility in every respect and requires a minimum of different network elements. Another advantage of the network is that it is readily extensible in terms of number of subscribers, geographical extent, and topological structure without the need for previous investments.

As far as reliability is concerned, the network offers a special advantage, which will now be explained with the aid of FIG. 5. In a preferred embodiment of the invention, the ends of the optical waveguides forming the branching net are connected to a fiber-optic ring main 50 by means of branch points A or B of the kind explained. At the end of each of the optical waveguides of the branching net, a controllable optical switch D is inserted in the respective optical waveguide ahead of the branch point A or B. Thus, the end of an optical waveguide of the branching net is only connected to the ring main 50 when the respective optical switch D is "closed". If part of the branching net fails, e.g., due to a break in a fiber or to a failure of one of the branch points, this can be easily remedied with the aid of the fiber-optic ring main and the optical switches D. If, for example, the optical waveguide extending between branch points 51 and 52 breaks, as is indicated in FIG. 5 at a point E, the resulting partial failure of the branching net can be replaced by closing the optical switches 53, 54, and 55. The novel combination of the branching net with the fiber-optic ring main shown in FIG. 5 offers maximum reliability and effective protection of the availability of the communication link, e.g. also from acts of violence (terrorism).

As mentioned above, the free ends of the optical waveguides of the branching net are terminated by reflectionless terminations. If, as shown in FIG. 5, each of the optical waveguides has an optical switch D and a branch point at its end, the reflectionless termination is provided by designing the optical switch as a reflection-free switch.

Optical switches are known per se, and they are normally reflection-free. A suitable optical switch is, for example, the above-mentioned known Y laser, which is also operable as an optical switch.

FIG. 6 shows that the element D of FIG. 5 performs the function of a (optical) switch. The side of the optical switch drawn as a heavy line is to symbolize its freedom from reflection.

I claim:

1. A network for transmitting messages between subscribers using light as a carrier, wherein the subscribers are connected to connecting points, and wherein optical signals transmitted into the network by any of the subscribers can be received at every subscriber connecting point, characterized in that the network has branch points (A,B), each branch point having three interconnected optical waveguides, that the three optical waveguides interconnected at a branch point are interconnected by a coupler which is bidirectional in each of three transmission paths, that the subscriber connecting points are arbitrary points along the individual optical waveguides of the network, that a coupler which is bidirectional in three transmission paths is provided at each of the connecting points, and that the free ends of the optical waveguides of the network are terminated by reflectionless terminations.

2. A network as claimed in claim 1, characterized in that a fiber-optic ring main (50) is provided, and that controllable optical switches (D) are provided at the ends of the optical waveguides of the network for connecting said ends to the fiber-optic ring main.

3. A network as claimed in claim 2, characterized in that a network management net (12) is provided for controlling and monitoring the network.

4. A network as claimed in claim 3, characterized in that an optical switching node (10) is provided which connects the network to similar networks.

5. A network as claimed in claim 2, characterized in that an optical switching node (10) is provided which connects the network to similar networks.

6. A network as claimed in claim 1, characterized in that branch points (A, B) are insertable at arbitrary points of the network.

7. A network as claimed in claim 1, characterized in that a network management net (12) is provided for controlling and monitoring the network.

8. A network as claimed in claim 1, characterized in that an optical switching node (10) is provided which connects the network to similar networks.

9. A network according to claim 1, wherein the network is a branching network.

* * * * *